Oct. 3, 1950 C. J. DALLEY 2,524,652
FASTENING MEMBER
Filed Aug. 20, 1947
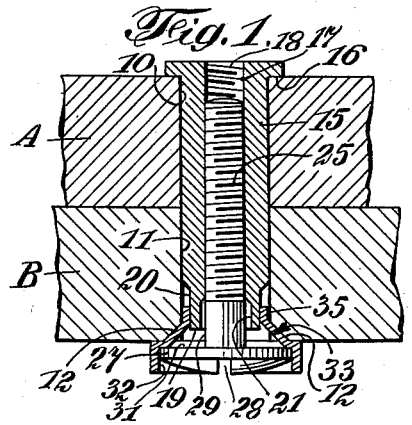
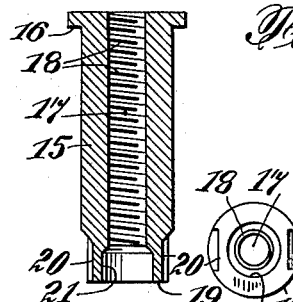
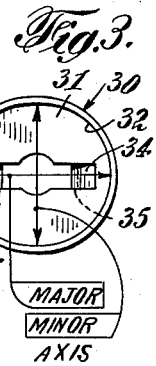
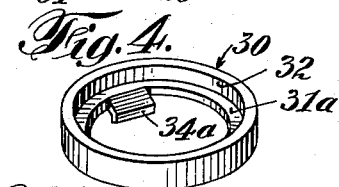
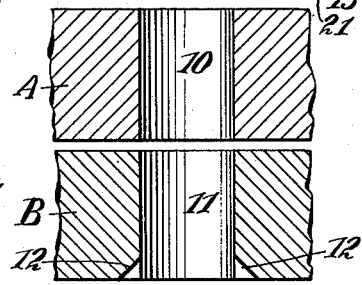
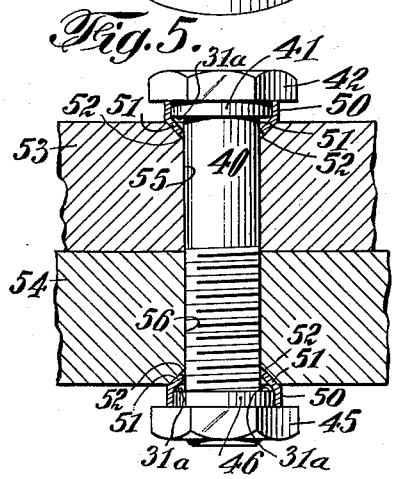
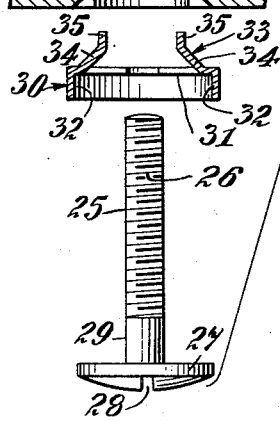
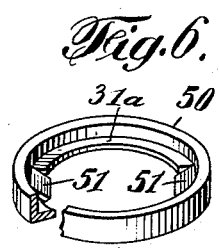
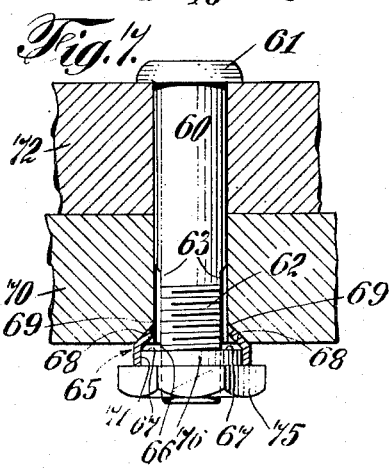
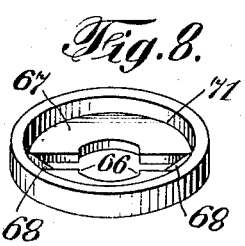
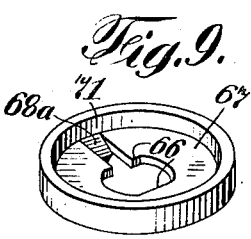
INVENTOR.
Charles J. Dalley
BY
C. P. Goepel
his ATTORNEY Patented Oct. 3, 1950

2,524,652

UNITED STATES PATENT OFFICE 2,524,652

FASTENING MEMBER

Charles J. Dalley, Maplewood, N. J.

Application August 20, 1947, Serial No. 769,701

1 Claim. (Cl. 287—101)

This invention relates to fastening members, in the nature of nut locks. More particularly the improved fastening member is applicable to cutting shears. It may be applied to other devices than shears, wherein a rotative member requires adjustment and then is desired to be held permanently in adjusted position, or applied where all parts are held stationary not as hinge joints.

There has been much difficulty in the arts, when a screw threaded bolt is used, in that accurate registration is almost impossible to obtain by mass production, manufacturers making screw threaded bolt shafts within plus and minus tolerances, so that of two bolts, one may have the extreme positive tolerance and the other the extreme negative tolerance. In other instances, the bolt shafts were upset to obtain a secure hold.

It has been proposed heretofore to hold a bolt shaft by means of a spring wire locked in position against rotation. This necessitates a separate hole for the anchoring of the ends of the spring wire. The spring itself extends only partially around the bolt shaft.

The present invention contemplates a complete instead of a partial encirclement of that cooperating part of the bolt member, by a rigid annulus having a yieldable part, which has means for locking it against rotation, and which annulus is so related to that part of the bolt member that a frictional engagement of said part and of the annulus may be conveniently brought about to the end that the annulus locked against rotation will hold the bolt member in the adjusted position desired to be permanently maintained. This frictional engagement may be achieved by the relative close fitting circumferences of the bolt member and the annulus. For more practical manufacturing conditions, the operative surfaces of the annulus are of elliptical shape with such dimensions relative to the circumference of the cooperating part of the bolt member as to deform the elliptical shape to a circular shape in conformity with that of the circular shape of the bolt member, or a circular annulus may be deformed by an eccentrically acting bolt member.

The annulus may find alternative embodiments once with a projection, once with a bent out portion, or with other means assuring a non-rotation of the annulus. The bolt member may also find alternative embodiments, once with the bolthead cooperating with the annulus, once with the nut cooperating with the annulus, or in some cases, the use of both of these embodiments in the same structure, as long as the relation of the bolthead or nut against movement in respect to each other is maintained after the desired adjustment has been established.

The invention will be further described, an embodiment shown in the drawings, and the invention will be finally pointed out in the claims.

In the accompanying drawings,

Fig. 1 is a vertical longitudinal section of a pair of relatively movable members having my improvement embodied therein;

Fig. 2 is a displaced view of the parts shown in Fig. 1;

Fig. 3 is a plan view of the annulus;

Fig. 4 is a perspective view of the annulus with only one projection;

Fig. 5 is a vertical longitudinal section of a compound fastening;

Fig. 6 is a perspective view of the annulus shown in Fig. 5;

Fig. 7 is a vertical longitudinal section showing a nut fastening only;

Fig. 8 is a perspective view of a modified form of annulus such as shown in Fig. 7, and Fig. 9 is a perspective view of an annulus with only one projection, and otherwise like that shown in Fig. 8.

Similar characters of reference indicate corresponding parts throughout the various views.

Referring to the drawings, and more particularly to Figs. 1 to 4, the movable blade A has a circular bore 10 and the relatively stationary blade B has a circular bore 11. The blade B has diametrically opposed cutouts 12, made by a sawcut. One of these cutouts may be dispensed with.

Into these two registering bores, 10 and 11, a sleeve bearing 15 is inserted. This sleeve bearing 15 has a shoulder 16 circumferentially disposed, and a bore 17, which is internally screw-threaded as shown by the threads 18. The end 19 has external cutouts 20, and an internal counterbore 21.

A screw 25 is externally screw-threaded as shown by 26, and has a flanged head 27, with the usual tool slot 28. The threads do not extend to the flanged head 27, but terminate in a cylindrical part 29, and it is for this reason that the counterbore 21 in the sleeve bearing 15 was provided.

The improvement also consists in the provision of a washer or annulus 30, which has a base portion 31 and a rim 32 at right angles thereto, extending from one side of the base portion 31. From the other side of the base portion 31, extend two diametrically opposed projections 33, which have a portion 34 inclined to the plane of the base portion 31, and another portion 35 bent into a shape parallel with the axis of the screw. These opposed projections 33 may be bent up from the base portion 31. The inclined portion 34 is shaped to register with the inclination of the cutouts 12 in the blade B. The portions 35 of the projection fit into the cutouts 20 of the sleeve bearing 15.

When the sleeve bearing 15 has been inserted into the registering bores 10 and 11 until the shoulder 16 is about against the outer surface of the blade A, then the washer or annulus 30 is placed in position to have the projection 33 engage the cutouts 12 and 20. Thereby the sleeve bearing 15 is locked against rotation since the washer of annulus 30 is locked against rotation in respect to the blade B. Thus the blade B, sleeve bearing 15, and annulus 30, act as one member, and for that reason is properly called the stationary blade, in contrast to the movable blade A.

With the annulus 30 disposed in the position described, the screw 25 is threaded in by turning it in the sleeve bearing 15, until the flanged head 27 is forced into the rim 32 to obtain a tight frictional hold. Thereby, the screw 25, when adjusted to permit a free bearing movement of one blade in respect to the other, is held in the position desired, since it is held by frictional contact against rotation. In this embodiment, the inner diameter of the rim 32 and the outer diameter of the flanged head 27 of the screw 15, are so dimensioned as to assure such a frictional holding contact, the outer diameter being forced within this upturned flange on these washers so as to require some force of entry.

The annulus 30 preferably has a major and minor axis (Fig. 3), that is, the inner bore of the rim 32 is of ellipical shape, and the flanged head 27 then expands the minor axis to substantially the length of the major axis, or in other words, the periphery of the flanged head 27 shapes the rim 32 to its own circular periphery. The annulus shown in Fig. 4, Fig. 6, Fig. 8 and Fig. 9, preferably is also of elliptical internal rim shape.

The base portion of the annulus or washer is continuously circular and rigid, and the rim is likewise circular but is yieldable. The outer diameter of the entering member, be it the head of the screw or part of the nut, is equal to the average length of the maximum and minimum axes of the rim. Upon entrance of the entering member coaxially with the rim, the slightly smaller diameter corresponding to the minimum axis of the rim is extended by the outer diameter of the entering member, and the diameter corresponding to the major axis of the rim is reduced substantially to the outer diameter of the entering member, whereby the peripheral circumference of the entering member is contiguous to a mean circumference of the inner surface of the rim, forming a line or surface contact. On the removal of the entering member from the rim, the rim returns to its initial major-minor axes relationship by its own inherent resiliency, ready for any other similar use.

Instead of two opposed projections on the annulus 30, only one may be used as shown in Fig. 4.

Instead of two opposed projections on the annulus 71, only one may be used as shown in Fig. 9.

Thus, a holding washer or annulus is used with a sleeve bearing for adjustment or tension of the hinge joints of the blades.

In Figures 5 and 6 is shown a holding washer or annulus for the conventional bolts with special bolt heads, and special nuts, namely, for other uses than shears.

In this embodiment, the screw threaded bolt 40 is provided with a subcaliber cylindrical portion 41, inward of its hexagonal head 42. The nut 45 of hexagonal shape has a subcaliber cylindrical portion 46.

The washer or annulus 50 has two opposed bent out projections 51 to fit into the cutouts 52, provided on each member 53 and 54, each of which has a circular bore 55, 56, registering with each other. Instead of two projections 51, only one may be used. The rim of the annulus 50 is dimensioned in respect to the subcaliber portions 41 and 46, as heretofore described.

In Figures 7 and 8, an embodiment is shown, with a holding washer or annulus used for adjustment or tension of hinge joints in which the bolt 60 has a flanged head 61, and its end 62 is screw threaded, and provided with flat sides 63. The washer or annulus 65 has flat sides 66 in its base portion 67. The annulus 65 has the bent out parts 68 which engage cutouts 69 of the stationary blade 70. The nut 75 has a subcaliber cylindrical collar 76 to engage the rim 71 of the annulus 65. The elliptical annulus 65 is dimensioned in respect to the subcaliber collar 76 as described. In this embodiment, the stationary blade 70 cooperates with a movable blade 72, as in Fig. 1. The annulus 65 has its flat sides 66 engage the flat sides 63 of the bolt 60, and these parts are locked against relative rotation. The projections 68 engage the cutouts 69, and thus lock the washer or annulus and hence the bolt against relative rotation. The subcaliber collar 76 engages the elliptical rim 71 frictionally as described, and thereby the nut is held in the desired adjusted position.

The annulus shown in Fig. 9 is like that shown in Fig. 8, but is provided with only one projection 68a.

The invention may be applied to a thread cutter of the type described in my co-filed application of August 28, 1947, Serial No. 770,976, or to any form of shears, or to such other purposes where a friction determining relationship, is desired to be maintained.

The essential is a rigid encircling non-rotative annulus of a shape expanded by the entrance of another member, whereby a relative stationary positioning of that member is secured, after it has been adjusted to proper position, and after the annulus has been locked against rotation.

I have described several forms of my invention, but obviously various changes may be made in the details disclosed without departing from the spirit of the invention as set out in the following claim.

I claim:

In a fastening member for a pair of relatively movable members, each having a bore, said bores being in registration with each other, at least one of said members having a cutout in its outer surface at the periphery of its bore, and means including a bolt holding the members pivotally together, the combination of a cylindrical portion on said bolt having an outer diameter larger than the diameter of the bolt, adjacent to said member with the cutout, an annulus disposed between said cylindrical portion and said cutout member, said annulus having a base portion with a central bore for the passage of said bolt, a projection extending outwardly from the plane of said base portion at one side thereof engaging the cutout of the member, and a continuous expansible substantially elliptical rim marginally extending from the other side of said base portion of substantially the same inner diameter as the outer diameter of said cylindrical portion, an inner diameter of the bore of said rim being less than the outer diameter of said cylindrical portion, whereby the annulus is locked to the said cutout member against rotation by the projection engaging the cutout, and said cylindrical portion is locked to the annulus by distortion of the rim, when said cylindrical portion is within the bore of the rim.

CHARLES J. DALLEY.

REFERENCES CITED

The following references are of record in the file of this patent:

UNITED STATES PATENTS

| Number | Name | Date |
|---|---|---|
| 769,199 | Tower | Sept. 6, 1904 |
| 1,159,360 | Clauss | Nov. 9, 1915 |
| 2,441,552 | Barnes | May 18, 1948 |